(12) United States Patent
Reimers et al.

(10) Patent No.: US 7,439,277 B2
(45) Date of Patent: Oct. 21, 2008

(54) IN-SITU PREPARATION OF HYDROPEROXIDE FUNCTIONALIZED RUBBER

(75) Inventors: Jay Reimers, Houston, TX (US); Jose Sosa, Deer Park, TX (US)

(73) Assignee: Fina Technology, Inc., Houston, TX (US)

(*) Notice: Subject to any disclaimer, the term of this patent is extended or adjusted under 35 U.S.C. 154(b) by 511 days.

(21) Appl. No.: 11/133,115

(22) Filed: May 19, 2005

(65) Prior Publication Data

US 2006/0276561 A1    Dec. 7, 2006

(51) Int. Cl.
C08J 3/28 (2006.01)

(52) U.S. Cl. .............. 522/26; 522/27; 522/28; 522/157; 522/158; 522/77; 522/79

(58) Field of Classification Search .......... 522/113, 522/26, 27, 28, 77, 79, 157, 158
See application file for complete search history.

(56) References Cited

U.S. PATENT DOCUMENTS

| | | | |
|---|---|---|---|
| 4,202,992 A * | 5/1980 | Coltrin et al. ......... | 568/575 |
| 4,777,210 A | 10/1988 | Sosa et al. | |
| 4,849,076 A | 7/1989 | Neckers | |
| 4,861,827 A | 8/1989 | Sosa et al. | |
| 5,075,347 A | 12/1991 | Platt et al. | |
| 5,849,937 A * | 12/1998 | Jubin et al. ............ | 549/529 |
| 6,329,553 B1 * | 12/2001 | Frei et al. ............. | 568/400 |
| 6,633,042 B1 | 10/2003 | Funken et al. | |

* cited by examiner

*Primary Examiner*—Susan W Berman
(74) *Attorney, Agent, or Firm*—Shirley A. Kopecky

(57) ABSTRACT

A process for the preparation of a hydroperoxide functionalized rubber compound by the conversion of triplet state oxygen to singlet state oxygen in the presence of oxygen and a light-induced photoreductant. A dispersion of an unsaturated rubber component in a carrier solvent is introduced into a reactor containing a permeable catalyst bed comprising a light-induced photoreductant component supported on a particulate substrate component and passed through the catalyst bed. A gaseous oxidizing agent is passed through the catalyst bed in contact with the rubber-containing dispersion. The catalyst bed is irradiated with electromagnetic light radiation in the ultraviolet or visible light range at an intensity sufficient to convert triplet oxygen in the oxygenated rubber component to singlet oxygen. The oxygenated rubber component is then recovered from the reactor. The reactor can comprise a tubular outer shell and a tubular inner member having a permeable wall defining an annular space containing photoreductant-supported substrate material. The oxidizing agent is introduced into the inner member and radially dispersed outward from this member into contact with the supported photoreductant. The solvent rubber component is concurrently passed into contact with the catalyst bed.

8 Claims, 2 Drawing Sheets

IN-SITU PREPARATION OF HYDROPEROXIDE FUNCTIONALIZED RUBBER

FIELD OF THE INVENTION

This invention relates to the in-situ preparation of hydroperoxide functionalized rubber and more specifically, to the formation of hydroperoxide sites on rubber molecules through the photoreduction of triplet state oxygen to singlet state oxygen employing supported photoreductant compositions.

BACKGROUND OF THE INVENTION

Light-induced photoreductants can be employed to excite triplet state oxygen to singlet state oxygen which can be employed in the formation of hydroperoxide sites which functionalize the initiation of polymerization reactions.

Singlet state oxygen can be reacted with unsaturated polymeric rubbers, such as diene rubber compounds, to form the corresponding hydroperoxide functionalized rubbers. The hydroperoxide functionalized sites on the rubber backbone provide reactive sites which enhance the grafting efficiency in the reaction of the rubbery polymer with the monomers which form pendant groups on polymeric backbones. The grafting efficiency for a particular monomer-polymer system is thus a function of the number of peroxide groups formed on each molecule of the rubbery polymer. All things being equal, the number of pendant groups formed on the polymer backbone increases with the efficiency of the photoreductant in exciting the triplet state oxygen to a singlet state.

Suitable photoreductant formulations for the production of hydroperoxide derivatives of rubber by the reduction of triplet state oxygen to singlet state oxygen are disclosed in U.S. Pat. No. 5,075,347. As disclosed there, various photosensitizing agents such as methylene blue, rose bengal, and others are dissolved in a solution of a rubbery polymer through the use of an alcohol-based solubilizer such as methanol, which enhances the solubility of the photosensitizing agent in the rubber solution. The rubbery solution containing the photosynthesizing agent is oxygenated and then subjected to irradiation with light having a wavelength in the 300-800 angstrom region to convert triplet oxygen to singlet oxygen for use in the polymerization of the rubber-containing solution.

SUMMARY OF THE INVENTION

In accordance with the present invention, there is provided a process for the preparation of a hydroperoxide functionalized rubber compound by the conversion of triplet state oxygen to singlet state oxygen in the presence of oxygen and a light-induced photoreductant. In carrying out the invention, there is provided a reactor containing a catalyst bed comprising a light-induced photoreductant component supported on a particulate substrate component forming a permeable catalyst bed. A dispersion of an unsaturated rubber component in a carrier solvent is introduced into the reactor and passed through the catalyst bed. Concomitantly with the introduction of the rubber component into the reactor, a gaseous oxidizing agent is introduced into the reactor and passed through the catalyst bed and into contact with the rubber-containing dispersion. The catalyst bed containing the dispersion and the oxidizing agent is irradiated with electromagnetic light radiation in the ultraviolet or visible light range at an intensity sufficient to convert triplet oxygen in the oxygenated rubber component to singlet oxygen. The oxygenated rubber component is then recovered from the reactor.

Preferably, the gaseous oxidizing agent and the rubber dispersion are passed through the reactor under concurrent flow conditions. In one embodiment of the invention, the reactor comprises a tubular outer shell and a tubular inner member having a permeable wall defining an annular space within the inner and outer members, with the photoreductant-supported substrate material disposed within the annular space. The oxidizing agent is introduced into the interior tubular member and radially dispersed outward from the tubular member into contact with the supported photoreductant disposed in the annular space. The carrier solvent containing the rubber component is concurrently passed into the annular space and into contact with the catalyst bed. Preferably, the electromagnetic radiation has a radiation wavelength predominantly within the region of 300-700 nanometers and the rubber-containing dispersant solution is irradiated at an illumination intensity within the range of 10-300 foot-candles. In yet a further preferred embodiment of the invention, the particulate substrate comprises an inorganic particulate having a predominant particle size within the range of 0.2-0.8 cm. Preferably, the support is silica, alumina or mixtures of silica and alumina having an average particle size within the range of 0.3-0.7 cm.

It is preferred in carrying out the invention that the oxygenated rubber compound produced in the reactor exhibits a hydroperoxide content within the range of 1-8 hydroperoxide groups, and more preferably 4-8 hydroperoxide groups, for each molecule of the rubber component. In yet a further aspect of the invention, the photoreductant component is supported on the substrate in an amount within the range of 0.01-0.1 gram-moles of photoreductant per gram of support. The unsaturated rubber component is passed through the catalyst bed at a space velocity (WHSV) based upon the amount of unsaturated rubber component in the carrier within the range of 0.5-15 $hrs^{-1}$. The unsaturated rubber component in the carrier solvent has a resident time within the catalyst bed which is subjected to illumination of at least 0.08 hr.

The reactant system through which the dispersion is passed can take the form of two or more reactors connected in series with one another or with two or more reactors connected in parallel with one another. Preferably, the reactors are spaced laterally from one another to provide for an array of reactors with parallel flow of the dispersion and the gaseous oxidizing agent and the catalyst beds are irradiated with a source of electromagnetic radiation located externally of the reactor array. In another embodiment of the invention, the reactor takes the form of an outer shell and an internal well structure within the outer shell to define an annulus. An illumination source is located within the internal well structure to provide for illumination of the supported photoreductant and rubber component within the annular space surrounding the source of illumination.

DETAILED DESCRIPTION OF THE INVENTION

Figure 1:
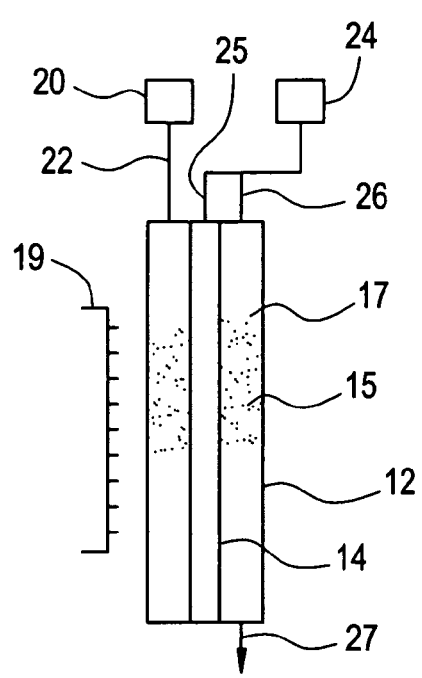
FIG. 1 is a side elevation schematic illustration of a reactor system for carrying out the present invention.

The present invention involves the use of a photosensitive dye and a light source in the presence of oxygen to produce singlet oxygen to create hydroperoxide groups on unsaturated rubber polymers, such as disclosed in the aforementioned U.S. Pat. No. 5,075,347 to Platt et al. However, in contrast to the procedure in Platt in which steps are taken to dissolve the photoreductant in a feed solution of the polymer, with or without the presence of one or more monomers which may be copolymerized with the rubbery polymer, the present invention proceeds in a different manner to employ a photoreductant dye which is supported on a particulate substrate, and thus is fixed with respect to the process streams of the rubber component and a gaseous oxidizing agent. Thus, the photoreductant dye is not consumed in the process, but instead is continuously regenerated as singlet oxygen is produced and moves on through the catalyst bed.

The rubbery polymers which can be employed in carrying out the present invention include various unsaturated rubber polymers which are well known to those skilled in the art, such as polybutadiene and other diene rubbers, EPDM terpolymer rubber and polyisoprene. Such rubbers are disclosed in the aforementioned patent to Platt et al. As disclosed there, examples of suitable diene rubbers include mixtures of one or more conjugated 1,3-dienes, such as butadiene, isoprene, piperylene and chloroprene. Such rubbers can take the form of homopolymers of conjugated 1,3-dienes and interpolymers of conjugated 1,3-dienes with one or more copolymerizable monoethylenically unsaturated monomers, e.g., copolymers of isobutylene and isoprene.

The rubbery polymer can take the form of a terpolymer of two different alpha-olefin monomers and a non-conjugated diolefin monomer. One alpha-olefin monomer can have from 2 to 4 carbon atoms and the other alpha-olefin monomer from 3 to 16 carbon atoms, with the number of carbon atoms in the one monomer being different than the number of carbon atoms in the other alpha-olefin monomer. Exemplary of such terpolymers are terpolymers of ethylene, propylene and a non-conjugated diolefin monomer (e.g., 5-ethylidene-2-norbornene). Such terpolymers are generally known in the art as EPDM rubbers. Alternatively, the rubbery polymer can be a homopolymer of 1,3-butadiene.

As disclosed in the Platt et al. patent, once the hydroperoxide functionalized rubber compounds are produced, they may be reacted with free radical polymerizable monomers to form side chains on the peroxide functionalized rubber backbone. Examples of suitable monomers which can be copolymerized with the rubbery compound include the monovinylidene aromatic hydrocarbons (e.g., styrene, aralkylstyrene, such as the o-, m- and p-methylstyrenes, 2,4-dimethylstyrene, the ar-ethylstyrenes, p-butylstyrene, etc.; and alpha-alkylstyrene, such as alpha-methylstyrene, alpha-ethylstyrene, alpha-methyl-p-methylstyrene, etc.; vinylnaphthalene, etc.); ar-halo-monovinylidene aromatic hydrocarbons (e.g., o-, m- and p-chlorostyrenes, 2,4-dibromostyrene, 2-methyl-4-chlorostyrene, etc.); acrylonitrile, methacrylonitrile, alkyl acrylates (e.g., methylacrylate, butyl acrylate, ethylhexyl acrylate, etc.), the corresponding alkyl methacrylates, acrylamides, (e.g., acrylamide, methylacrylamide, N-butylacrylamide, etc.); unsaturated ketones (e.g., vinyl methyl ketone, methyl isopropenyl ketone, etc.); alpha-olefins (e.g., ethylene, propylene, etc.); vinyl esters (e.g., vinyl acetate, vinyl stearate, etc.); vinyl and vinylidene halides (e.g., the vinyl and vinylidene chlorides, and bromides, etc.); and the like. The monomers can be copolymerized with the rubbery component in the course of oxygenating the rubber containing disbursion as it flows through the catalyst bed. In this case, the unsaturated rubber component in the carrier solvent will also include a monomer component so that copolymerization occurs as the rubber component is functionalized by the oxidation reaction. Alternatively, the oxygenated rubber component can be recovered from the reactor and then applied to a polymerization zone where it reacted with one or more monomers to form the desired copolymers.

Suitable photoreductant dyes which can be employed in the present invention include acridine, methylene blue, rose bengal, tetraphenylporphine, A protoporphyrin, A phthalocyanine and eosin-y and erythrosin-b. For a further description of processes for the hydroperoxide functionalization of rubber polymers and the various rubbery polymers, monomers and photoreductant components which may be employed in carrying out the present invention, references is made to the aforementioned U.S. Pat. No. 5,075,347 to Platt et al., the entire disclosure of which is incorporated herein by reference.

As noted previously, although the various components of the type disclosed in Platt may be used in carrying out the present invention, the invention employs a different mode of operation which involves supporting the photoreductant dye component on a particulate support. The supports employed in carrying out the present invention may be of any suitable type which function when the photoreductant component is supported thereon to form a permeable catalyst bed. Support materials for use in the present invention include inorganic support particles, such as silica and alumina particles. Other substrate materials which can be employed to provide support for the photoreductant component include plastic materials such as polystyrenes, which are disclosed in U.S. Pat. No. 4,849,076 to Neckers et al. Preferably, however, inorganic substrates such as silica and alumina particles are employed in carrying out the invention, since the photoreductant formulations can be effectively bonded to such inorganic substrate particles. The supported photoreductant particles are deployed in a suitable catalyst bed of various configurations as described below in order to provide a permeable bed through which the carrier solvent containing the unsaturated rubber component, and optionally a suitable monomer component, can be passed under a moderate pressure gradient, along with the air other gaseous oxidizing agents using in carrying out the invention.

In experimental work respecting the invention, methylene blue was supported on two different alumina supports and on a silica support. The alumina support was available from Alcoa—under the designation F-200 in two different particles sizes. One particle size was composed predominantly of ⅛ inch alumina spheres and the other alumina support was composed predominantly of ¼ inch alumina spheres. The silica was a silica gel obtained from EM Science (Gibbstown, N.J.) in an irregular shaped 3 to 8-mesh particle size, that is, the silica particles passed through an 3-mesh screen and were retained on an 8-mesh screen, and was available under the designation SX0143R-1. The experimental work was carried out under a continuous flow photo-oxidation procedure simulation of the operation of the present invention, and also in a batch-type procedure in which the solution oxidized was mixed with the supported photoreductant material for periods ranging from 5-10 minutes and then withdrawn.

Two different sizes of the F-200 alumina were used, ¼" and ⅛" spheres, to address any possible affects of pressure drop in the fixed bed. The alumina was pretreated by adjusting the pH of an aqueous suspension to 11, and then drying the alumina at 200° C. for at least a day. No pretreatment was employed for the silica gel. Each support was then added to dry toluene, and after dissipation of the resulting exotherm, a solution of methylene blue in methylene chloride was added, and the dispersions were rolled on a roller for 12 hours. Catalyst break-up was observed when the methylene chloride was added to the silica gel, but the alumina remained intact. The resulting alumina supports contained about 0.10 moles of methylene blue per gram of support, and the silica gel contained about 0.20 moles of methylene blue per gram of support. For the continuous process, a HPLC column having a volume of 77.75 cc was used for the photo-hydroperoxidation reaction. With this configuration, the methylene blue loading per gram of feed solution was 0.13 µmoles per gram of feed solution for the aluminas, and 0.25 moles per gram of feed solution for the silica. Oxygen was introduced to 4% rubber feed solution by means of an air sparger in the feed container, delivering 10 cc of air per minute. The majority of this air remained dissolved, but occasionally bubbles were introduced to the column. The residence time in the column was about 10 minutes±1 minute, depending on the catalyst packing. Two levels of light intensity were used: ambient hood lighting at about 10 ft-candles and halogen flood lighting at about 180 ft-candles. After passing through the column the feed was charged to the first of two continuously stirred reactors (CSTRs) in series, and polymerized with 170 ppm of an initiator 9-(ethyl-3,3-di-t-butylperoxy)butyrate available as Luprox L-233 from Arkema, Philadelphia, Pa. The temperatures were controlled in both reactors, so as to achieve at least 25% solids in the last reactor. The polymerization runs were completed to 70% solids in a batch CSTR.

In additional experimental work, varying amounts of the supported methylene blue were added to a 4% rubber feed solution and treated batchwise. In these experiments different amounts of the supported photo-catalyst were added to a standard amount of feed, and then sparged with air while being exposed to ambient lighting. The feed was decanted from the photo-catalyst and polymerized in a batch CSTR, using 170 ppm of L-233 initiator, and a temperature profile of 2 hours at 110° C., 1 hour at 130° C., and 1 hour at 150° C.

Samples from the rubber experiments were subjected to particle size and rubber evaluations. Additional samples from the batch rubber treatments and from the p-cymene and decalin photo-oxidations were subjected to hydroperoxide titration.

The results of the continuous and batch photo-oxidations followed by polymerizations appear in Table 1. From these results, several trends can be observed. In two batch runs, a catalyst to feed ratio of 0.05 µmoles/g of feed, and an exposure time of ten minutes in ambient lighting appeared to be optimal. With these conditions, approximately 42 ppms of hydroperoxide were formed, or 20 ppm of active oxygen. For comparison, it is noted that the addition of 170 ppm of the L-233 initiator, added 18 ppm of active oxygen. Accordingly, about 6 hydroperoxide groups per rubber molecule were formed, assuming that the rubber was the principle substrate attacked by the singlet oxygen—an assumption supported by the rate constants. The rate reaction of singlet oxygen with polybutadiene is $3.4(10)^5 L\text{-mol}^{-1}\text{-s}^{-1}$, and for styrene $5.0(10)^3 L\text{-mol}^{-1}\text{-s}^{-1}$. All of the continuous runs, resulted in low rubber particle sizes, less than one micron, making it impractical to measure the gel content. At levels of photo-oxidation less than the optimum, occurring at lower catalyst to feed ratios or lower exposure times, improvement in rubber chemistries was still observed, but not as substantial. Conversely if higher photo-oxidation was achieved, as was the case in all of the continuous runs, the grafting was excessive, resulting in low particle sizes, and a core-shell morphology was observed. Typically, core-shell morphologies are expensive to obtain commercially. This approach can provide a lower cost alternative.

The results of the last two runs showed that other substrates prone to oxidation, in this case compounds with tertiary carbons, could be used. Ethylbenzene, like styrene, has a fairly low reaction rate with singlet oxygen, $3.6(10)^3 L\text{-mol}^{-1}\text{-s}^{-1}$, and was considered a non-reactive diluent. This approach could be used to make an initiation catalyst in-situ, while still functionalizing the polybutadiene.

In all of the experiments, the final product was not colored. Even though the dye discoloration was observed in some of the more severe experiments—those with high light intensities, the dye was not removed by the feed solution.

TABLE 1

| # | Type | Feed | Support | Catalyst/Feed, µmoles/g | $\tau_\omega$ minutes | Light Intensity (ft-candles) | Hydroperoxide, ppm | RPS, µm | Swell Index | Gel/Rubber |
|---|---|---|---|---|---|---|---|---|---|---|
| 1 | Continuous | 4% Rubber | ¼" Alumina | 0.13 | 10 | 10 | — | <1 | 26.04 | — |
| 2 | Continuous | 4% Rubber | ¼" Alumina | 0.13 | 10 | 180 | — | <1 | 25.88 | — |
| 3 | Continuous | 4% Rubber | ⅛" Alumina | 0.13 | 10 | 10 | — | <1 | 17.62 | — |
| 4 | Continuous | 4% Rubber | ⅛" Alumina | 0.13 | 10 | 180 | — | <1 | 19.88 | — |
| 5 | Continuous | 4% Rubber | Silica | 0.25 | 10 | 10 | — | <1 | 18.10 | — |
| 6 | Continuous | 4% Rubber | Silica | 0.25 | 10 | 180 | — | <1 | 20.70 | — |
| 7 | Batch | 4% Rubber | ¼" Alumina | 0.0125 | 5 | 10 | 10.6 | 3.25 | 17.52 | 3.20 |
| 8 | Batch | 4% Rubber | ¼" Alumina | 0.0125 | 10 | 10 | 11.0 | 3.00 | 19.83 | 3.28 |
| 9 | Batch | 4% Rubber | ¼" Alumina | 0.025 | 5 | 10 | 16.0 | 2.90 | 14.12 | 3.36 |
| 10 | Batch | 4% Rubber | ¼" Alumina | 0.025 | 10 | 10 | 15.7 | 3.09 | 17.62 | 3.32 |
| 11 | Batch | 4% Rubber | ¼" Alumina | 0.05 | 5 | 10 | 4.4(?) | 2.70 | 20.36 | 2.67 |
| 12 | Batch | 4% Rubber | ¼" Alumina | 0.05 | 10 | 10 | 41.6 | 2.97 | 14.80 | 4.61 |
| 13 | Batch | 10% Decalin in EB | ¼" Alumina | 0.025 | 10 | 10 | 42.2 | — | — | — |
| 14 | Batch | 10% Cymene in EB | ¼" Alumina | 0.025 | 10 | 10 | 22.7 | — | — | — |

In another set of experiments, methylene blue supported on ¼" alumina supports were added to 10% solutions of decalin (decahydronapthalene) and p-cymene (isopropyl toluene) in ethylbenzene and treated batchwise under the aforementioned conditions.

1. Rubber particle size (RPS) is obtained with a Malvern Particle Size Analyzer in methyl ethyl ketone.

2. Swell Index, % gels and % rubber are determined using the procedures outlined in "Encyclopedia of Industrial Chemical Analysis," F. D. Snell and L. S. Ettre, Eds., vol. 18, p. 329-332, 1973, Interscience Publishers, New York.

In summary of the experimental work, the batch type runs indicated that a methylene blue to a feed ratio of 0.05 moles per gram and then exposure to ambient lighting of ten minutes produced optimum or near optimum results. Roughly six hydroperoxide groups per rubber molecule, corresponded to 20 PPM of active oxygen, resulted. The polymerization of this treated feed resulted in a polymer with a gel to rubber ratio of 4.6 and a swell index of 14.8.

Turning now to the drawings and referring first to FIG. 1, there is illustrated a schematic diagram of one form of a reactor system suitable for carrying out the invention. As shown in FIG. 1, the reactor 10 that comprises a tubular outer shell 12 and a tubular inner member 14. Members 12 and 14 define an annulus 15 which contains a catalyst bed 17 formed by particles of a substrate material as described above upon which is supported a photoreductant component. All or part of the wall portion of the tubular member 12 is transparent to electromagnetic radiation in the ultraviolet or visible light range. A source of radiation 19 is disposed along outer tubular member and opposed to a transparent wall section thereof. A disbursion of an unsaturated rubber component in a container 20 is supplied via input line 22 to the top of the reactor and into the permeable annular catalyst bed. A gaseous oxidizing agent such as air or oxygenated air is supplied from a source 24 through a line 25 to the interior of tubular inner member 14 and preferably also through a line 26 to the interior of the annular space 15. The oxygen flows into tubular member 14 and through the permeable wall thereof into the surrounding catalyst bed. In addition, oxygen is also supplied via line 26 directly to the annular space. The light source 19 radiates the catalyst bed containing the disbursion of rubber component and the oxygen at an intensity sufficient to convert triplet oxygen in the oxygenated rubber component to singlet oxygen. After a suitable residence time within the reactor, the oxygenated rubber component is recovered through an outlet line 27.

Figure 2:
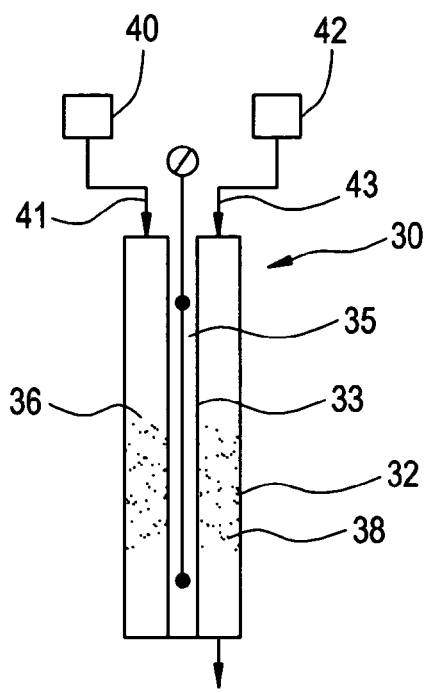
FIG. 2 is a side elevation schematic illustration of another form of reactor system suitable for carrying out the present invention.

Referring now to FIG. 2, there is illustrated a reactor 30 to be employed in another embodiment of the invention in which a source of illumination is located internally within a permeable catalyst bed containing a supported photoreductant component. As shown in FIG. 2, the reactor 30 comprises an outer shell member 32 and an internal well structure 33 within which a source of illumination 35 is located. The well structure 33 is formed of glass or transparent plastic and defines an annulus 36 within which particles comprising a light induced photoreductant component supported on a particulate substrate are arranged to provide a permeable catalyst bed 38. A dispersion of an unsaturated rubber component in a carrier solvent as described previously is supplied from a container 40 through line 41 into the annulus and flows through the catalyst bed 38. A gaseous oxidizing agent is simultaneously supplied into the annulus 36 for flow through catalyst bad from an oxygen source 42 and an inlet line 43.

Figure 3:
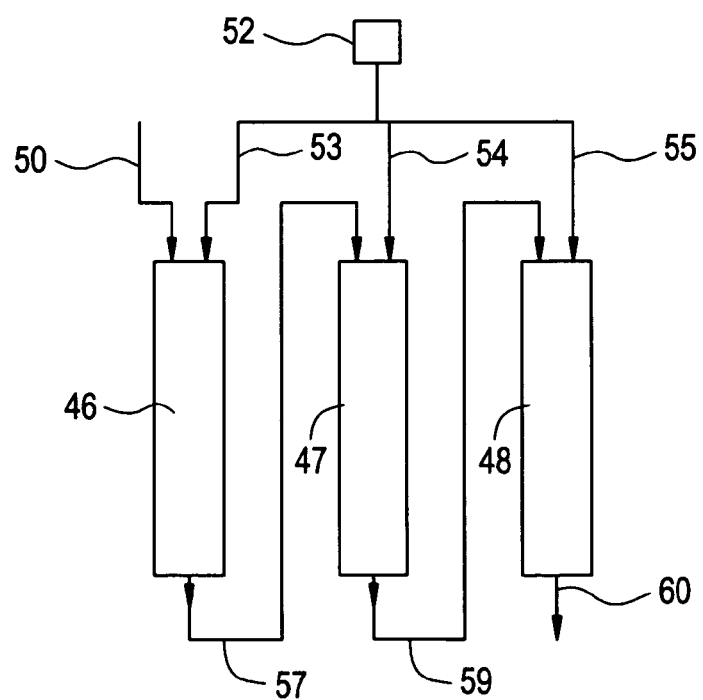
FIG. 3 is a schematic illustration of a plurality of series connected reactors useful in carrying out the invention.

In a preferred embodiment of the invention a plurality of reactors such as those depicted in FIG. 1 or FIG. 2 may be employed in carrying out the invention. The reactors may be arranged in a series or in parallel. FIG. 3 illustrates a reactor system comprising a plurality of series connected reactors 46, 47 and 48. Each of reactors 46, 47 and 48 contain a permeable catalyst bed as described previously and are supplied with a unsaturated rubber component in a carrier solvent supplied to the first reactor 46 via line 50 and a gaseous oxidizing agent supplied from a suitable source 52 to reactors 46, 47 and 48 via lines 53, 54 and 55 respectively. Reactors 46, 47 and 48 may be configured after the previously described reactors 12 and 32 or they may be in any other suitable form. In any case, each reactor contains a permeable catalyst bed as described previously (not shown) and the system is configured with a suitable illumination system (not shown) to radiate the disbursion of the unsaturated rubber component as it flows sequentially through the catalyst beds. As indicated in FIG. 3, the output from reactor 46 is supplied via line 57 to the top of catalyst bed in reactor 47 and the outlet from reactor 47 is supplied via line 59 to the top of reactor 48. The output from reactor 48 is supplied through an outlet line 60 to a suitable gathering system, or if additional series connected reactors are deployed, to the top of the next reactor in the cascade arrangement.

Figure 4:
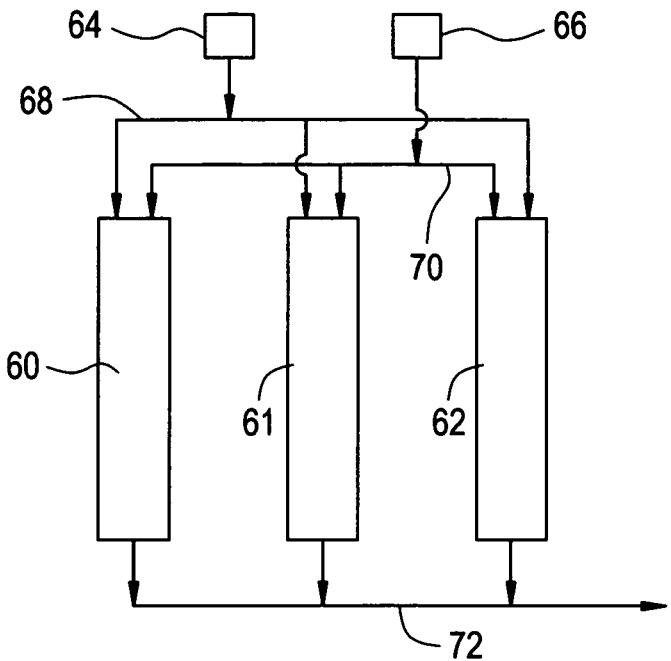
FIG. 4 is a side elevation schematic illustration of a plurality of parallel connected reactors useful in carrying out the invention.

In yet another embodiment of the invention, a reactor system comprising a plurality of reactors connected in parallel with one another are employed in carrying out the present reaction. In this embodiment of the invention, as illustrated in FIG. 4, a plurality of reactors 60, 61 and 62 are arranged in parallel and connected to a source 64 of an unsaturated rubber component in a carrier solvent and a source of a gaseous oxidizing agent 66 through input manifolds 68 and 70 respectively. Each of the reactors contains a permeable catalyst bed (not shown) and the system is provided with a suitable illumination system (not shown) for irradiating the catalyst beds with ultraviolet or visible light. The outputs from reactors 60, 61 and 62 are supplied to a production manifold system 72.

Figure 5:
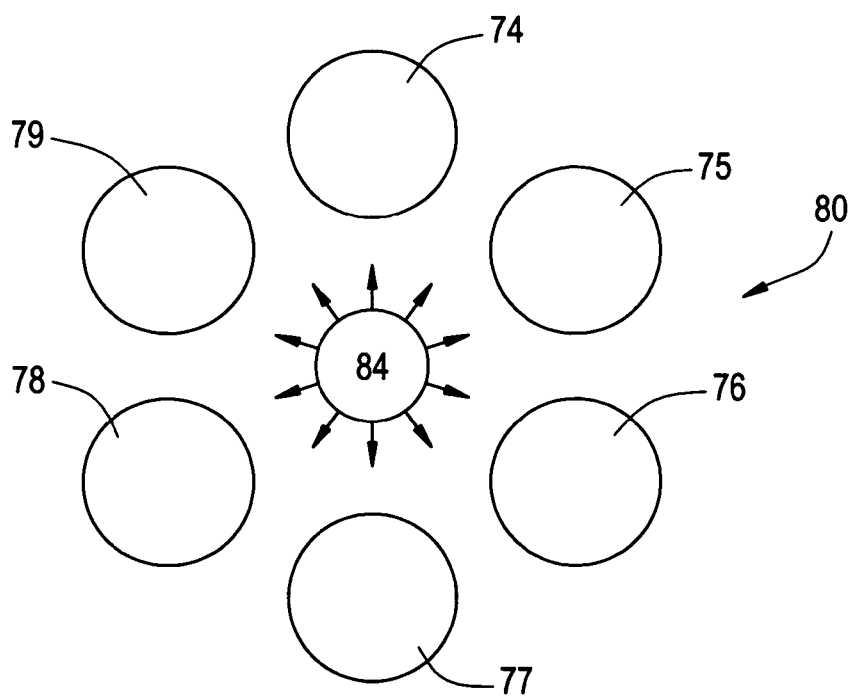
FIG. 5 is a plan view of a plurality of parallel connected reactors arranged in an array surrounding an internal light source.

FIG. 5 is a schematic plane view of a plurality of reactors arranged in a parallel flow configuration. More specifically and as shown in FIG. 5, reactors 74 through 79 are arranged spaced laterally from one another to provide a reactor array 80. The reactor array is provided a suitable inlet and outlet manifolding (not shown) for the flow of oxygen and unsaturated rubber component into the catalyst beds within the reactors and an outlet manifold for the collection of oxygenated rubber component. An elongated light source 84 is located internally within the array so as to radiate the disbursion flowing through the reactors each of which, of course, have a transparent external walls opposed to the light source. In addition, one or more sources of light or ultraviolet radiation may be located externally of the reactor array to provide additional illumination.

Having described specific embodiments of the present invention, it will be understood that modifications thereof may be suggested to those skilled in the art, and it is intended to cover all such modifications as fall within the scope of the appended claims.

We claim:

1. A method for the preparation of a hydroperoxide functionalized rubber compound comprising:

(a) providing a reactor containing a catalyst bed comprising a light-induced photoreductant component supported on a particulate substrate forming a permeable catalyst bed;

(b) introducing into said reactor a dispersion of an unsaturated rubber component in a carrier solvent and passing said dispersion through said catalyst bed;

(c) concomitantly with subparagraph (b), passing a gaseous oxidizing agent into said reactor and flowing said oxidizing agent through said catalyst bed and into contact with said rubber-containing dispersion;

(d) irradiating said catalyst bed containing said dispersion and said oxidant with electromagnetic radiation in the ultraviolet or visible light range at an intensity sufficient to convert triplet oxygen in the oxygenated rubber component to singlet oxygen and recovering said oxygenated rubber compound from said reactor; and (e) passing the dispersion of rubber-containing carrier and the gaseous oxidizing agent into a second reactor connected in parallel with said first reactor and containing a second catalyst bed comprising a light-induced photoreactant supported on a particulate substrate material forming a second permeable catalyst bed and irradiating said catalyst bed containing said dispersion and said oxidizing agent with electromagnetic radiation in the ultraviolet or visible light range at an intensity sufficient to convert triplet oxygen in the oxygenated rubber component to singlet oxygen and recovering said oxygenated rubber compound from said second reactor and combining said compound with the compound recovered from said first reactor.

2. A method for the preparation of a hydroperoxide functionalized rubber compound comprising:
   (a) providing a reactor containing a catalyst bed comprising a light-induced photoreductant component supported on a particulate substrate forming a permeable catalyst bed;
   (b) introducing into said reactor a dispersion of an unsaturated rubber component in a carrier solvent and passing said dispersion through said catalyst bed;
   (c) concomitantly with subparagraph (b), passing a gaseous oxidizing agent into said reactor and flowing said oxidizing agent through said catalyst bed and into contact with said rubber-containing dispersion;
   (d) irradiating said catalyst bed containing said dispersion and said oxidant with electromagnetic radiation in the ultraviolet or visible light range at an intensity sufficient to convert triplet oxygen in the oxygenated rubber component to singlet oxygen and recovering said oxygenated rubber compound from said reactor;
   (e) wherein said particulate substrate comprises an inorganic particulate material having the predominant particle size within the range of 0.2-0.8 cm; and
   (f) wherein said inorganic support is selected from the group consisting of silica, alumina and mixtures thereof.

3. The method of claim 1 wherein said inorganic support comprises alumina having an average particle size within the range of 0.3-0.7 cm.

4. The method of claim 1 wherein said inorganic support comprises silica having an average particle size within the range of 0.3-0.7 cm.

5. A method for the preparation of a hydroperoxide functionalized rubber compound comprising:
   (a) providing a reactor containing a catalyst bed comprising a light-induced photoreductant component supported on a particulate substrate forming a permeable catalyst bed;
   (b) introducing into said reactor a dispersion of an unsaturated rubber component in a carrier solvent and passing said dispersion through said catalyst bed;
   (c) concomitantly with subparagraph (b), passing a gaseous oxidizing agent into said reactor and flowing said oxidizing agent through said catalyst bed and into contact with said rubber-containing dispersion; and
   (d) irradiating said catalyst bed containing said dispersion and said oxidant with electromagnetic radiation in the ultraviolet or visible light range at an intensity sufficient to convert triplet oxygen in the oxygenated rubber component to singlet oxygen and recovering said oxygenated rubber compound from said reactor, wherein said reactor comprises an outer shell and an internal well structure within which said source of illumination is located, wherein said well structure and said shell define an annulus surrounding said source of illumination in which said catalyst bed is located.

6. A method for the preparation of a hydroperoxide functionalized rubber compound comprising:
   (a) providing a reactor containing a catalyst bed comprising a light-induced photoreductant component supported on a particulate substrate forming a permeable catalyst bed;
   (b) introducing into said reactor a dispersion of an unsaturated rubber component in a carrier solvent and passing said dispersion through said catalyst bed;
   (c) concomitantly with subparagraph (b), passing a gaseous oxidizing agent into said reactor and flowing said oxidizing agent through said catalyst bed and into contact with said rubber-containing dispersion; and
   (d) irradiating said catalyst bed containing said dispersion and said oxidant with electromagnetic radiation in the ultraviolet or visible light range at an intensity sufficient to convert triplet oxygen in the oxygenated rubber component to singlet oxygen and recovering said oxygenated rubber compound from said reactor, wherein said reactor comprises an outer shell and an internal well structure within which said source of illumination is located, wherein said well structure and said shell define an annulus surrounding said source of illumination in which said catalyst bed is located.

7. The method of claim 6 within which said annulus surrounding said internal illumination source has a thickness of no more than 20 cm.

8. A method for the preparation of a hydroperoxide functionalized rubber compound comprising:
   (a) providing a plurality of reactors each containing a catalyst bed comprising a light-induced photoreductant component supported on a particulate substrate forming a permeable catalyst bed;
   (b) introducing into said reactors a dispersion of an unsaturated rubber component in a carrier solvent and passing said dispersion through the catalyst beds of said reactors;
   (c) concomitantly with subparagraph (b), passing a gaseous oxidizing agent into said reactors and flowing said oxidizing agent through said catalyst beds and into contact with said rubber-containing dispersion with said catalyst beds; and
   (d) irradiating said catalyst beds containing said dispersion and said oxidizing agent with electromagnetic radiation in the ultraviolet or visible light range at an intensity sufficient to convert triplet oxygen in the oxygenated rubber component to singlet oxygen and recovering said oxygenated rubber component from said reactor, wherein said reactors are spaced laterally from one another to provide for an array of said reactors with parallel flow of said dispersion and said gaseous oxidizing agent through said catalyst beds and wherein said catalyst beds are irradiated with a source of electromagnetic radiation located internally of said array.

* * * * *